Patented May 27, 1952

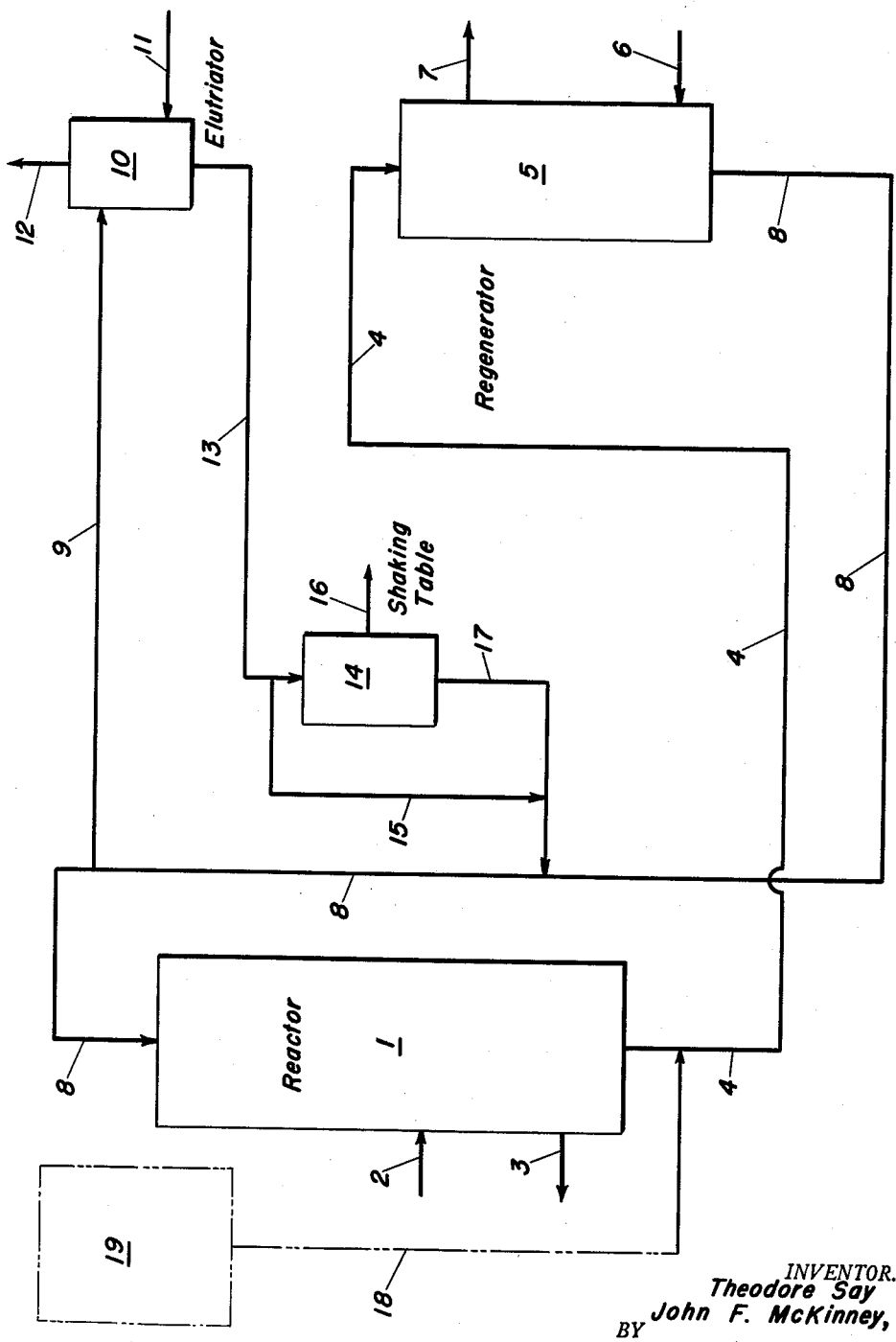

2,598,309

UNITED STATES PATENT OFFICE 2,598,309

CATALYTIC CRACKING OF HYDROCARBON OIL

Theodore Say, West Chester, and John F. McKinney, Jr., Ridley Park, Pa., assignors to Sun Oil Company, Philadelphia, Pa., a corporation of New Jersey Application November 3, 1948, Serial No. 58,134

3 Claims. (Cl. 196—52)

This invention relates to the catalytic treatment of hydrocarbon oils by contact with a moving bed of catalyst particles. More particularly, it relates to a hitherto unrecognized source of catalyst for use in a moving bed catalytic treatment process.

Catalytic treatment of hydrocarbon oil with particle-form catalyst which alternately catalyzes a reaction and is regenerated has been accomplished heretofore with a fixed catalyst bed and with a moving catalyst bed type of operation.

In the fixed bed type of operation, the catalyst is disposed in a chamber where it alternately contacts reactant materials and regenerating gas until its period of usefulness in the fixed bed process is over, at which time it is removed and discarded. Catalytic treatment of hydrocarbon oil with a fixed bed of catalyst particles has been used to effect the following types of reaction: cracking, cyclization, hydrogenation, dehydrogenation and desulfurization.

In the moving bed type of operation, the catalyst particles move as a compact mass in a cycle through a reaction and a regeneration zone. Catalytic treatment of hydrocarbon oil with a moving bed of catalyst particles has been to date used principally for cracking and for gasoline treating.

Particle-form catalysts for treatment of hydrocarbon oil will be described with reference to the silica-alumina type of catalyst which is widely used in cracking processes.

Particle-form silica-alumina cracking catalysts are usually 6 to 16 mesh in size and may be of any convenient shape. A typical method of preparing such catalyst is by co-precipitating from aqueous solution an aluminum salt and sodium silicate, adjusting the pH to the point where a gel is formed, drying the gel, washing and grinding, extruding, and cutting off portions to make the particles.

An important property of cracking catalyst is its activity, which is defined as the percent conversion by the catalyst of gas oil having an A. P. I. gravity of 36° and a boiling range of 415° F.–710° F. into 410° F. end point gasoline, when the temperature of conversion is 800° F., the pressure of conversion atmospheric, and the space rate 1.5 volumes of liquid oil per volume of catalyst per hour. A method for determining cracking catalyst activity is described in an article which appears on pages R–537 and R–538 of the National Petroleum News dated August 2, 1944.

As catalyst is used for hydrocarbon conversion, its activity decreases, and concurrently its density increases. It is therefore possible by gravity separation means to resolve a mixture of catalyst particles of varying activities into component mixtures having different average catalyst activities. Various gravity separation means are known in the art to remove continuously from a moving mixture of solid particles of varying densities the particles of highest density. This may be accomplished by the use of a shaking table comprising a vibrating screen on top of which the particles are disposed and through which air is blown from below. The denser particles are levitated less by the air stream, and therefore travel farther laterally with the vibration of the screen.

Diminution of catalyst activity as its length of service increases requires that it be eventually replaced. In fixed bed operation, typical practice has been to charge a chamber with freshly made catalyst of about 45 activity, use the catalyst for hydrocarbon conversion for a substantial period of time, e. g., one year, at the end of which time the catalyst particles will have substantially decreased in activity, then shut down the chamber and replace the deactivated catalyst with freshly made catalyst. The degree to which catalyst is allowed to decrease in activity in a fixed bed process is determined by a balance between the cost of replacing the catalyst and the decrease in value of the cracked products due to smaller gasoline yields as the catalyst ages.

Diminution of catalyst activity usually encountered in service is believed to be caused by an effect which causes decrease in surface area and increase in density of the particles. In fixed bed operation, however, there is an additional phenomenon of catalyst poisoning by ferric oxide, or rouge, which is formed by oxidation of the chamber walls and deposition of the oxidation product on the catalyst. Ferric oxide deposits cause the catalyst to become more active in catalyzing coke formation, less active in catalyzing gasoline formation. Other poisoning agents which are sometimes encountered include chromium, nickel, sulfur and nitrogen compounds. Furthermore, channeling of regenerating gas through certain parts of the catalyst bed sometimes occurs, in which case some parts of the bed are incompletely regenerated and build up carbonaceous deposits, which decrease the effectiveness of the catalyst.

In moving bed operation, it is generally desirable to maintain a substantially constant amount of catalyst, of substantially constant average activity, within the catalyst-cycling system. This has heretofore been accomplished by periodically adding freshly made catalyst having activity of about 45 in quantity sufficient to counteract the general activity decrease in the system. In order to maintain the desired quantity of catalyst in the system, removals of catalyst are necessary. Some catalyst is lost from the system in the form of very fine particles formed by attrition of the original particles and removed from the system by elutriating apparatus supplied for that purpose, but catalyst lost in this manner will not ordinarily completely compensate for fresh catalyst added to maintain activity.

The removal of catalyst other than fines may be performed without any selection on the basis of catalyst density, in which case particles having activities ranging from 0 to 45 are removed and discarded; however, it is advantageous to remove selectively the catalyst of highest density and lowest activity, because less catalyst is then required to treat any given quantity of hydrocarbon oil.

According to the present invention, further economies of catalyst utilization are possible, because we have discovered that catalyst which has, through employment in a fixed bed unit for the treatment of hydrocarbon oil, undergone diminution in surface area, poisoning by ferric oxide, and accumulation of carbonaceous deposits is, to an important extent, revivified by further employment in a moving bed unit. Thus, according to the invention, catalyst which has been used in fixed bed units can be advantageously utilized in moving bed units for the further treatment of hydrocarbon oils. Instead of adding only freshly made catalyst to maintain the desired activity in the moving bed system, catalyst which has been previously used in a fixed bed system is added for that purpose, either exclusively or alternately or in admixture with freshly made catalyst.

Reference is made to the attached drawing as a representation of a preferred embodiment of the invention.

The drawing schematically represents a catalyst-cycling system comprising a reactor, a regenerator, an elutriator and means for circulating catalyst particles in a closed cycle. All these elements may be of any suitable known type and construction. In addition, shaking table means for selectively removing low activity catalyst from the regenerated catalyst mixture are shown, and they may also be of any suitable construction.

In the particular embodiment represented by the drawing, catalytic cracking of any suitable hydrocarbon oil charge stock is effected in a system which continuously circulates an average of about 900 tons of catalyst having an average activity of about 30. The charge enters the reactor 1 through the line 2 as a vapor, a liquid or a mixture of both and therein comes in contact with the compact moving bed of catalyst particles. Cracked products are formed and removed from the reactor through the line 3.

The catalyst bed moves continuously from the reactor through the line 4 to the regenerator 5, wherein it comes in contact with air or other oxygen-containing gas introduced through line 6. Carbonaceous deposits are burned from the catalyst surface and flue gas is removed from the regenerator through line 7.

The catalyst moves continuously from the regenerator through line 8 to the reactor. About five per cent of the catalyst so transported is withdrawn as a side stream from line 8 through line 9 and delivered to the elutriator 10, wherein air introduced through line 11 separates the catalyst fines from the remainder of the catalyst and removes them through line 12 at the rate of about 1½ tons per day.

The catalyst from which fines have been separated leaves the elutriator through line 13 and is fed to the shaking table 14. A part of catalyst stream 13 by-passes the shaking table through line 15. The shaking table removes and discards through line 16 about 1½ tons per day of catalyst having activities in the range from 0 to 10. The remainder of the catalyst is removed from the shaking table through line 17, remixed with the catalyst in by-pass line 15, and introduced into line 8, carrying regenerated catalyst to the reactor.

In order to maintain the average catalyst activity in the system at about 30, catalyst of average activity above 30 is added to the system through line 18 in quantity averaging about 3 tons per day. The source of this added catalyst is schematically represented by the dotted-line enclosure 19. In the present embodiment, approximately equal amounts on the average of freshly made catalyst and of catalyst having activities substantially within the range 30—33 that has previously been used in a fixed bed cracking operation are added to the system. The make-up catalyst is represented as being introduced into line 4 leading to the regenerator, but it may enter the system at any other convenient point.

The used catalyst from the fixed bed process is of lower activity than freshly made catalyst, because in the fixed bed operation it has become partially aged and also poisoned by ferric oxide or other deposits. Furthermore, some particles will carry carbonaceous deposits resulting from incomplete combustion in the fixed bed. However, samples of catalyst taken at various points in a moving bed system to which has been added used catalyst from a fixed bed system show no deposits of ferric oxide or permanent carbonaceous deposits, indicating that the used catalyst has been partially revivified by the grinding action of the moving bed, and that the poisoning deposits, rather than accumulating and poisoning freshly made catalyst, have been removed from the system.

If used catalyst having 30–33 activity were added to the system to the exclusion of freshly made 45 activity catalyst, the average activity in the system could be stabilized at about 30 by removing catalyst of activity below about 28 through the shaking table. In such operation, however, catalyst would have to be added to and removed from the system at a much greater rate.

Although the invention has been described with reference to a catalytic cracking process, it is to be understood that it is generally applicable to any treatment of hydrocarbon oil wherein the latter is contacted with a particle-form catalyst which undergoes in fixed bed operation both a cyclic contamination and regeneration and a continuous cumulative deactivation, caused by fusing, poisoning or accumulation of ordinarily regenerable deposits.

We claim:

1. The method for utilizing silica-alumina cracking catalyst particles to obtain therefrom a prolonged period of active use in catalytic cracking of hydrocarbon material which comprises: contacting a stationary bed of such catalyst particles with hydrocarbon material under cracking conditions; periodically regenerating in situ the catalyst particles by combustion of carbonaceous materials, the contacting with hydrocarbon material and the regenerating being conducted in alternate cycles until the particles have undergone partial permanent deactivation to a reduced catalytic cracking activity level above which level the catalytic cracking activity of the particles cannot be restored by such regenerating, the deactivated particles having iron oxide poisons deposited on the surface thereof; withdrawing said deactivated particles from use in the stationary bed operation and transferring said deactivated particles to a catalytic cracking system wherein silica-alumina cracking catalyst particles move continuously as a compact bed through zones of reaction and regeneration; and using said deactivated particles to crack hydrocarbon material in the cracking system employing the moving compact bed until said deactivated particles have undergone additional permanent deactivation before removing the particles from the moving compact bed system.

2. The method for utilizing silica-alumina cracking catalyst particles to obtain therefrom a prolonged period of active use in catalytic cracking of hydrocarbon material which comprises: contacting a stationary bed of such catalyst particles with hydrocarbon material under cracking conditions; periodically regenerating in situ the catalyst particles by combustion of carbonaceous materials, the contacting with hydrocarbon material and the regenerating being conducted in alternate cycles until the particles have undergone partial permanent deactivation to a reduced catalytic cracking activity level above which level the catalytic cracking activity of the particles cannot be restored by such regenerating, the deactivated particles having iron oxide poisons deposited on the surface thereof; withdrawing said deactivated particles from use in the stationary bed operation; transferring and adding said deactivated particles to a catalytic cracking system wherein silica-alumina cracking catalyst particles move continuously as a compact bed through zones of reaction and regeneration, and from which cracking system catalyst particles, having high density relative to the average density of the particles in the body of catalyst in the system and having cracking activity substantially below the average cracking activity of said body of catalyst, are selectively removed and to which cracking system freshly prepared catalyst particles, having cracking activity substantially above said average cracking activity of said body of particles, are added; said deactivated particles having average cracking activity substantially below the cracking activity of said freshly prepared catalyst and substantially above the activity of the relatively dense catalyst which is selectively removed from the system; and using said deactivated particles to crack hydrocarbon material in the cracking system employing the moving compact bed until said deactivated particles have undergone additional permanent deactivation before removing the particles from the moving compact bed system.

3. Method according to claim 2 wherein said deactivated particles have average catalytic cracking activity of about 30–33 and wherein the average catalytic cracking activity of the total catalyst in the moving bed system is maintained at about 30.

THEODORE SAY.
JOHN F. McKINNEY, Jr.

REFERENCES CITED

The following references are of record in the file of this patent:

UNITED STATES PATENTS

| Number | Name | Date |
|---|---|---|
| 1,412,219 | Richardson | Apr. 11, 1922 |
| 2,209,040 | Simpson et al. | July 23, 1940 |
| 2,264,433 | Gaylor | Dec. 2, 1941 |
| 2,268,187 | Churchill | Dec. 30, 1941 |
| 2,348,156 | Sheppard | May 2, 1944 |
| 2,407,817 | Danner | Sept. 17, 1946 |
| 2,419,508 | Simpson et al. | Apr. 22, 1947 |

OTHER REFERENCES

Shabaker: "Houdry Pioneer," vol. 3, No. 1, May 1948, pages 1 to 8, published by Houdry Process Corp., 225 S. 15th Street, Philadelphia 2, Penna.

Kelso et al.: "Houdry Pioneer," vol. 1, No. 3, pages 1–8, March, 1946.